United States Patent
Cohen et al.

(10) Patent No.: US 10,262,133 B1
(45) Date of Patent: Apr. 16, 2019

(54) SYSTEM AND METHOD FOR CONTEXTUALLY ANALYZING POTENTIAL CYBER SECURITY THREATS

(71) Applicant: Cyarx Technologies Ltd., Tel Aviv-Yafo (IL)

(72) Inventors: Alon Cohen, Even Yehuda (IL); Amos Stern, Hod Hasharon (IL); Garry Fatakhov, Holon (IL)

(73) Assignee: Cyarx Technologies Ltd., Tel-Aviv-Yafo ( * ) Notice: Subject to any disclaimer, the term of this patent is extended or adjusted under 35 U.S.C. 154(b) by 186 days.

(21) Appl. No.: 15/001,865

(22) Filed: Jan. 20, 2016

(51) Int. Cl.
*G06F 21/55* (2013.01)
*H04L 29/06* (2006.01)
*H04L 12/24* (2006.01)

(52) U.S. Cl.
CPC .......... *G06F 21/552* (2013.01); *H04L 41/065* (2013.01); *H04L 63/14* (2013.01); *G06F 2221/034* (2013.01)

(58) Field of Classification Search
CPC .. G06F 17/30958; G06F 21/55–21/554; G06F 2201/86; G06F 2221/034; G06Q 10/06–10/06398; H04L 41/0631–41/065; H04L 41/22; H04L 63/14–63/1491; H04L 63/20–63/205
See application file for complete search history.

(56) References Cited

U.S. PATENT DOCUMENTS

| | | |
|---|---|---|
| 9,306,965 B1 | 4/2016 | Grossman et al. |
| 2014/0337971 A1 | 11/2014 | Mont et al. |
| 2015/0356301 A1 | 12/2015 | Diehl et al. |
| 2016/0212171 A1* | 7/2016 | Senanayake ............ H04L 63/20 |
| 2017/0093910 A1 | 3/2017 | Gukal et al. |
| 2017/0134410 A1* | 5/2017 | Muddu ............... H04L 63/1425 |

OTHER PUBLICATIONS

"Processor". The Computer Desktop Encyclopedia (CDE). http://lookup.computerlanguage.com/ (Oct. 5, 2017) (Year: 2017).*
"Memory". TechTerms. https://techterms.com/definition/memory (Apr. 5, 2018) (Year: 2018).*

* cited by examiner

*Primary Examiner* — Kevin Bechtel
(74) *Attorney, Agent, or Firm* — M&B IP Analysts, LLC

(57) ABSTRACT

A system and method for contextually analyzing potential cyber security threats. The method comprises receiving at least one event, wherein the at least one event is associated with at least one entity; parsing the at least one event; modeling, based on at least one modeling rule, the at least one parsed event to determine the at least one characteristic; and generating a graph based on the determined at least one characteristic, wherein the graph represents the relationships among the at least one entity.

13 Claims, 5 Drawing Sheets

SYSTEM AND METHOD FOR CONTEXTUALLY ANALYZING POTENTIAL CYBER SECURITY THREATS

TECHNICAL FIELD

The present disclosure relates generally to cyber security, and more particularly to analysis of potential security threats.

BACKGROUND

As usage of computers and the Internet has increased exponentially in recent years, computer viruses, data leaks, network outages, and other results of cyber-attacks have become incredibly significant. These results can yield a wide variety of harmful effects, from user inconvenience to significant financial or physical damage. Enterprises often rely on computer systems for daily transactions and to store sensitive information and/or other potentially valuable information. Such systems and information are key targets for malicious cyber activity. The harmful effects are amplified as the size of the target's computer networks and systems increase. To combat cyber-attacks, these organizations deploy cyber security systems for detecting and mitigating potential cyber-attacks.

Due to the vast array of types of cyber-attacks, cyber security systems and, in particular, cyber security systems of large organizations, include increasing numbers of security controls from a multitude of sources for responding to threats. Each of these controls may be focused on a different aspect of an organization's security and may generate a variety of alerts related to potential security threats. To manage potential security threats, solutions for security information and event management (SIEM) have been developed. SIEM solutions attempt to provide real-time analysis of security alerts including, for example, logs of security events representing potentially malicious activity.

Existing SIEM solutions face challenges in utilizing security alert information to aid in identification and mitigation of ongoing threats. In particular, some existing solutions provide information regarding each generated security alert in a log format. These existing solutions typically result in overly cumbersome amounts of data to be analyzed manually by cyber security experts. The large amounts of data often prominently feature massive amounts of false positives. Therefore, security alerts related to true malicious activity may not be given appropriate attention, and security experts may fail to properly address the malicious activity.

To organize the vast amounts of information provided by SIEM systems and the like, some conventional solutions utilize static rules for aggregating data related to security alerts from different security systems and for organizing the aggregated data. As such, the conventional solutions nevertheless fail to provide truly appropriate responses to ongoing threats because they lack flexibility in organizing the data. Security alerts generated in response to malicious activity that do not meet the requirements of the static rules may be ignored by such systems. Further, such existing solutions are not capable of logically connecting interrelated events. This lack of logical connections may result in data that still includes numerous false positives and does not provide complete information regarding true security threats to cyber security experts.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for contextually analyzing potential security threats. The method comprises receiving at least one event, wherein the at least one event is associated with at least one entity; parsing the at least one event; modeling, based on at least one modeling rule, the at least one parsed event to determine the at least one characteristic; and generating a graph based on the determined at least one characteristic, wherein the graph represents the relationships among the at least one entity.

Certain embodiments disclosed herein also include a system for contextually analyzing potential security threats. The system includes a processing unit; and a memory, the memory containing instructions that, when executed by the processing unit, configure the system to: receiving at least one event, wherein the at least one event is associated with at least one entity; parsing the at least one event; modeling, based on at least one modeling rule, the at least one parsed event to determine the at least one characteristic; and generating a graph based on the determined at least one characteristic, wherein the graph represents the relationships among the at least one entity.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
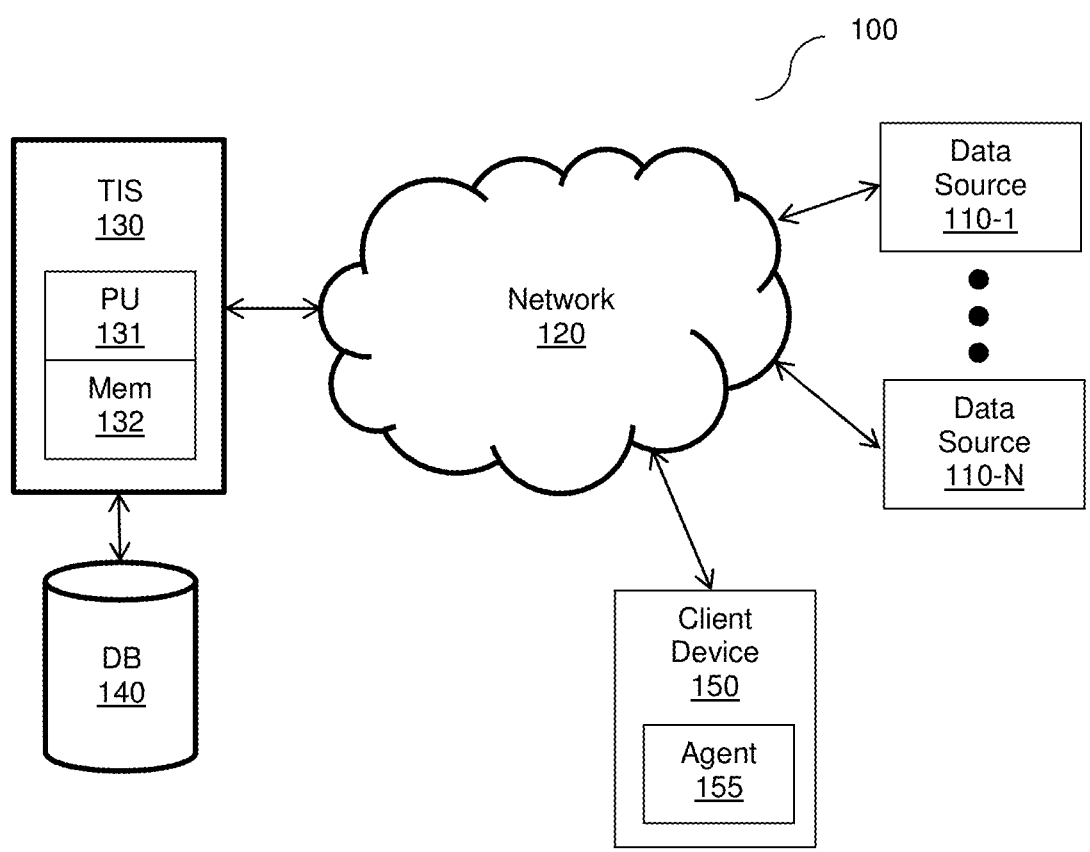
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a threat investigation system and methods therefor for contextually analyzing potential cyber security threats. In an embodiment, the threat investigation system is configured to analyze events received from internal and/or external security systems and to store contextual information respective of the analysis to allow rapid threat analysis. The analysis of received events is performed, in part, by identifying each received event's type and its entities (or entity), as well as connections between entities. Each event is correlated with other received events to produce intelligent insights and to provide added value to the end-users at least about cyber-security threats. In an embodiment, the system is further configured to generate a graph based on the analysis of the event and to display the graph to end-users. This provides the user with an intuitive visual tool for investigating cyber-security threats, thereby eliminating the need for time-consuming research by cyber-security analysts.

FIG. 1 shows an exemplary and non-limiting network diagram 100 utilized to describe the various disclosed embodiments. The network diagram 100 includes a plurality of data sources 110-1 through 110-N (hereinafter referred to individually as a data source 110 and collectively as data sources 110, merely for simplicity purposes), a network 120, a threat investigation system (TIS) 130, a database 140, and a client device 150.

Each of the data sources 110 identifies and/or includes information used to contextually analyze potential security threats. Such information may be, but is not limited to, security events and cases. An event includes or designates at least one entity. Each entity may be a system or device associated with an organization. Each entity may further be internal or external. Internal entities may be, e.g., entities belonging to an organization. For example, internal entities include IP addresses, hostnames, devices of organization, and the like. A case may include rules corresponding to one or more events respective of one or more entities. In some embodiments, cases may not be input to the threat investigation system 130.

The data sources 110 may include, but are not limited to, security information management (SIM) systems, security event management (SEM) systems, security information and event management (SIEM) systems, events management repositories (e.g., SPLUNK®), security detection systems (e.g., intrusion protection systems (IPSs), web application firewalls (WAFs), database (DB) security systems, endpoint security systems, and network access control (NAC) systems), case management systems, application programming interfaces (APIs), and the like.

The threat investigation system 130 is communicatively connected to the data sources 110 via the network 120. The network 120 may be, but is not limited to, a wireless, cellular or wired network, a local area network (LAN), a wide area network (WAN), a metro area network (MAN), the Internet, the worldwide web (WWW), similar networks, and any combination thereof.

The threat investigation system 130 is configured to receive at least events from the data sources 110. In an embodiment, the events may be included in source files from the data sources 110. The threat investigation system 130 is configured to parse the received events to identify entities and relationships between the entities. The entities may be, for example, hosts, network addresses (e.g., IP addresses, MAC addresses, etc.), users, systems, and/or devices. Each identified entity may represent a source or a destination of an event. The threat investigation system 130 is further configured to determine the relationship types between entities, event directions, connection types between entities, events groups, and so on. The events analysis, in an embodiment, is performed using a data modeling process as described in detail herein below.

In an embodiment, the threat investigation system 130 may be configured to retrieve enrichment information based on the analyzed or otherwise modeled events. The enrichment information may include, but is not limited to, entity enrichment information, threat intelligence information, information gathered from organization silos, and so on. The entity enrichment information may include, but is not limited to, whether each entity is an internal entity or an external entity. The threat intelligence information may be based on monitoring of, e.g., commercial feeds, open source systems, information sharing and analysis centers, TOR exit nodes, and the like.

The threat investigation system 130 may be further configured to fuse the parsed information and/or the enrichment information into a single unified data format. The data fusion may be based on one or more predetermined rules for converting data from one format into another. The single unified format of the data allows for expression of the data via a single representation (e.g., a graph).

Based on the modeling of events, the threat investigation system 130 is configured to generate a graph demonstrating relationships among entities respective of the events. In an embodiment, the graph may further include the enrichment information. The graph may be illustrated via a visual representation. Such a visual representation allows a user (e.g., a cyber security expert) to efficiently identify patterns or other notable features of events in real-time, thereby accelerating analysis of events received from multiple sources and decreasing overall investigation times. In another embodiment, the threat investigation system 130 may further be configured to store the graph in, e.g., the database 140.

Additionally, the graph may allow for user interactions that, when detected, may trigger drill-down analyses of the graph respective of particular entities. The drill-down analysis allows the user to easily retrieve all information on each entity displayed in the graph. For example, for each entity, a user can request a list of other entities connected to that entity during the past day, week, etc. The user can further define a specific connection type of relationship of an entity "under investigation" with other entities. The requested information is visually presented to the user in a matter of seconds without requiring the user to code complex queries (e.g., SQL queries). Exemplary screenshots for visual representations of a generated graph and drill-down analysis according to the disclosed embodiments are describe further herein below with respect to FIGS. 4 and 5.

In an embodiment, the threat investigation system 130 may be further configured to correlate the received cases into groups respective of the modeling. As non-limiting examples, cases may include events related to the same entity, events that occurred around the same time, events occurring on the same network, combinations thereof, and so on. Examples for case rules may be time of a day, an identified entity, and so on. The case groupings allow for organization of events based on relationships to potential threats. Additionally, potential security threats represented by the cases may be prioritized based on, but not limited to, a number of events in each case, a weight of each event in the case, combinations thereof, and so on. The prioritization may be utilized to select which data to be automatically provided to a user (e.g., a cyber security expert) during the investigation.

In another embodiment, the threat investigation system 130 may be further configured to generate an analysis report respective of the graph. The analysis report may include, but is not limited to, the graph, a visual representation of the graph, threat levels event or event groups, statistics, contextual information, and so on. The statistics may include, but are not limited to, a number of events, a number of event groups, and so on.

The threat investigation system 130 may be further communicatively connected to the client device 150 via the network 120. The client device 150 may be, but is not limited to, a personal computer, a laptop, a tablet computer, a smartphone, and the like.

In some exemplary configurations, the client device 150 may include an agent 155 installed therein. The agent 155 may be, but is not limited to, a mobile application, a software application, and the like. The agent 155 may receive the graph from the threat investigation system 130 and cause a display of a visual representation of the graph and/or a user interface (e.g., a graphical user interface) on the client device 150. In an embodiment, the agent 155 may receive and display the graph in real-time. In certain configurations, the agent 155 may receive from the threat investigation system 130 a data structure including entities and their connections and render the graph on the client device 150 respectively.

Upon receiving an interaction with the user interface, the agent 155 may send information regarding the user interaction to the threat investigation system 130. The threat investigation system 130 may be configured to send, in real-time, additional information based on the user interaction, thereby illustrating a drill-down investigation respective of the user interaction. As an example, if a user clicks on a particular case, the agent 155 may send information about the click to the threat investigation system 130, which provides more details about the case for the agent 155 to display to the user.

In an embodiment, the threat investigation system 130 includes a processing unit (PU) 131 coupled to a memory (mem) 132. The processing unit 131 may comprise or be a component of a processor (not shown) or an array of processors coupled to the memory 132. The memory 132 contains instructions that can be executed by the processing unit 131. The instructions, when executed by the processing unit 131, cause the processing unit 131 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit 131 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein It should be noted that FIG. 1 is described with respect to a single client device 150 merely for simplicity purposes and without limitation on the disclosed embodiments. Multiple client devices may be communicatively connected to the threat investigation system 130 via the network 120 without departing from the scope of the disclosure.

It should be further noted that the database 140 may be connected to or included in the threat investigation system 130 without departing from the scope of the disclosure.

Figure 2:
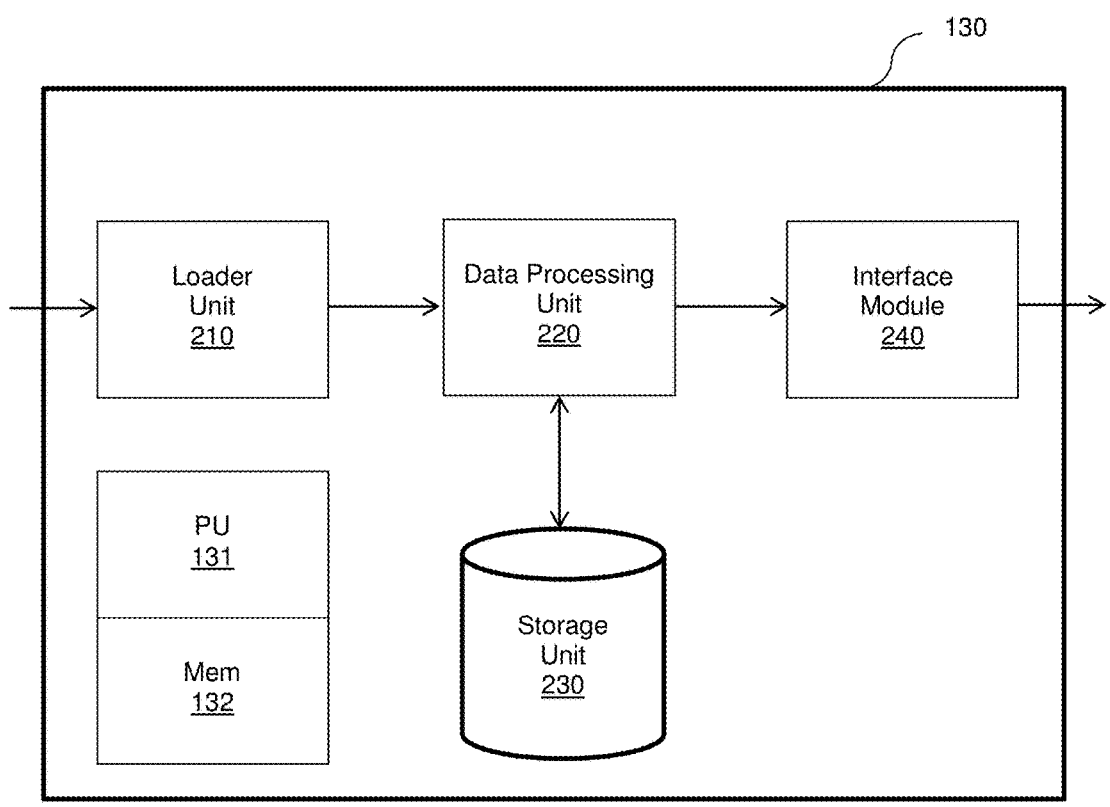
FIG. 2 is a schematic diagram illustrating a threat investigation system for contextually analyzing security events according to an embodiment.

FIG. 2 is an exemplary and non-limiting block diagram of the threat investigation system 130 according to an embodiment. The threat investigation system 130 includes the processing unit 131, the memory 132, a loader unit 210, a data processing unit 220, a data fusion unit 230, a storage unit 240, and an interface module 250.

The loader unit 210 is configured to receive data such as, but not limited to, events and cases from the data sources 110. In an embodiment the loader unit 210 can be utilized to receive enrichment information (e.g., entity enrichment information and threat intelligence information) by interfacing with external systems, such as enterprise systems, commercial feeds, open source systems, information sharing and analysis centers, and/or exit nodes. In an embodiment, the loader unit 210 may be further configured to validate the received data. The validation includes, for example, determining whether the receive data is in a known format, from a recognizable source, and so on.

The data processing unit 220 is configured to receive the data including events and enrichment data from the loader unit 210, to model or otherwise analyze the events, to optionally enrich the model events with enrichment information, to fuse the enriched modeled events into a unified format, to generate a graph displaying the various entities and the connections/relationships between entities, and so on. The data processing unit 220 performs an iterative process where a generated graph is updated as new events are received. The new events are modeled and correlated to previously processed events in the graph. That is, groups of correlated events (or their respective entities) are matched to the graph. In an embodiment, the enrichment and data fusion tasks are optional.

In order to model the events, the data processing unit 220 is further configured parse each received event and to perform a modeling process on the parsed events. The modeling process is based on a set of rules designed to identify entities and to determine the event, entities, connections, and relationship characteristics. Specifically, these characteristics include whether an entity is a primary or secondary entity, a relationship type, an event direction, a connection type between entities in the event, entity groups, and so on.

Following are a few non-limiting examples of rules for modeling events and the characteristics. A rule looking for unique identifiers in an entity is used to determine if an entity is primary or secondary. A primary entity includes a host or a user, while a secondary entity includes an IP or a MAC address.

The relationship type can be determined based on a rule that checks the connection type between the primary entities involved in the event. The relationship type may be user to user, user to host, host to host, and self-event. The event direction is determined using a rule identifying the flow between the primary entities involved in the event. For example, an event direction may be inbound, outbound, or self. The connection types may include primary to secondary entities, primary to primary, secondary to primary, and secondary to secondary. The rule for the entity groups check if entities can be grouped into logical containers to allow an enrichment of the group.

The data processing unit 220, as part of a fusion task, is further configured to combine data related to the correlated events into a single unified format data set. The combined data may include, but is not limited to, the events, the enrichment information, and so on. The data processing unit 220 is further configured to generate a graph using the unified format data set. The data processing unit 220 may further be configured to match groups of the correlated events to the graph. In an embodiment, the matching may further include determining a prioritization for each group of events. The data processing unit 220 may be further configured to store the graph and the matched event groups in the storage unit 230.

In an embodiment, the data processing unit 220 is configured to process cases received through the loader unit 210. The cases may be contextually correlated based on mapping of entities defined in each case to the generated graph. The correlation may result in groupings of cases. The cases may be grouped respective of each entity and its associated relationships. It should be appreciated that grouping of cases reduces the total number of cases to handle, and thus the time to investigate a threat. Typically, a single threat can trigger dozens of cases, but using the disclosed system, the dozens of cases can be grouped to a single contextually correlated case.

The interface module 240 is configured to cause a display of the generated graph to a user via, for example, a client device (e.g., the client device 150). In an embodiment, the interface module 240 is configured to receive selections respective of a threat investigation via a user interface on the client device. The interface module 240 may cause a display of a drill-down analysis respective of the selections. As an example, the interface module 250 may detect a user interaction respective of an entity in a graph displayed on the client device and provide additional information regarding the entity.

It should be noted that FIG. 2 is described with respect to the features of FIG. 1 merely for simplicity purposes and without limitation on the disclosed embodiments. The threat investigation system 130 may be utilized in different networks without departing from the scope of the disclosure.

The various elements discussed with reference to FIG. 2, can be implemented as hardware, firmware, software or any combination thereof and can be realized by the agent 125 (of a user device 120) and/or the server 130. When implemented in hardware, such elements may include one or more electronic circuits for processing audio signals or one or more processing systems.

Figure 3:
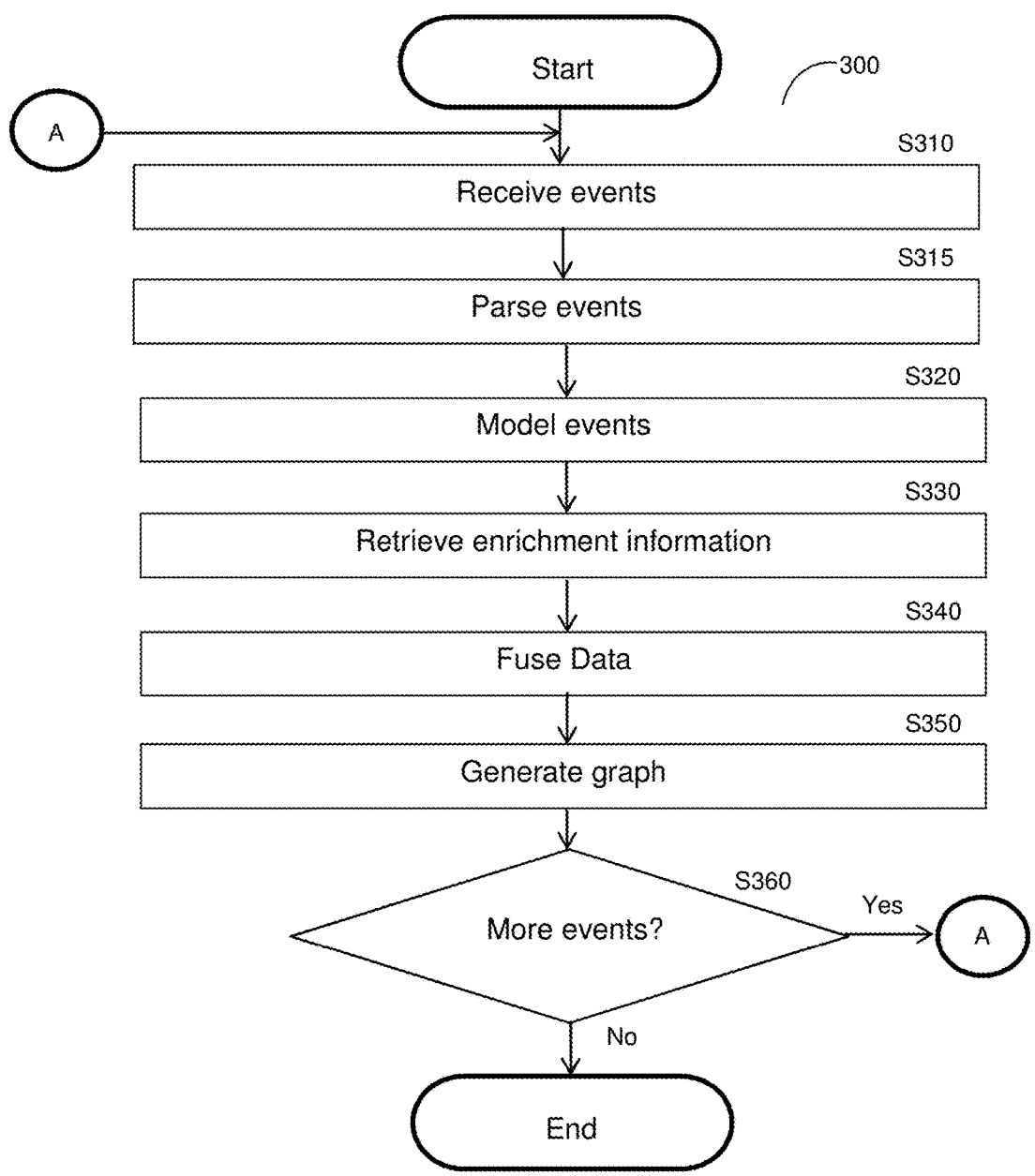
FIG. 3 is a flowchart illustrating a method for correlating security alerts according to an embodiment.

FIG. 3 is an exemplary and non-limiting flowchart 300 illustrating a method for generating graphs based on contextual analysis of security events according to an embodiment. In an embodiment, the method may be performed by a threat investigation system (e.g., the threat investigation system 130).

In S310, security events are received from one or more data sources. The events may be related to entities associated with an organization. As an example, an entity may be the source or the destination of an event. The entities may be, but are not limited to, hosts, addresses (e.g., IP/MAC addresses), users, systems, and/or devices. In an embodiment, S310 may further include receiving one or more cases respective of the received events.

In S320, the received events are analyzed or otherwise modeled in order to determine entities, connections, and relationship characteristics. As noted above, the modeling or analysis is performed using on a set of modeling rules. In an embodiment, the modeling may include parsing the received events into and determine the respective characteristics using the modeling rules. The modeling processing and its rules are discussed in greater detail above.

In S330, enrichment information related to the events may be retrieved respective of the events. The enrichment information may include, but is not limited to, entity enrichment information, threat intelligence information, and so on. The entity enrichment information may include, but is not limited to, whether each entity is an internal entity or an external entity. The threat intelligence information may be respective of monitoring of commercial feeds, open source systems, information sharing and analysis centers, exit nodes, and so on. In an embodiment, S330 is optional.

In S340, data including the modeled events and preferably the enrichment information may be fused or unified into a single unified data set. The data fusion may include reformatting all of the data into one common data format. Reformatting the data into one common format allows for comparable analysis of information having different original data formats. In an embodiment, S340 is optional.

In S350, a graph is generated based on the unified data set. The graph may represent relationships between the entities respective of the events associated with the entities. An exemplary representation of a graph is provided in FIG. 4. In an embodiment, S350 may further include storing the generated graph. The generated graph may be utilized to generate a visual illustration of the contextually clustered events. The graph may be generated in real-time and updated as new events are received and processed. Accordingly, the visual illustration allows a user (e.g., a cyber security expert) viewing the visual illustration to conduct a real-time investigation into the various graphed events and entities. Further, the visual illustration of the entities and their connections through a graph allows the user to conduct a drill-down analysis of the various entities.

In S360, it is checked whether additional events have been received and, if so, execution continues with S310; otherwise, execution terminates. It should be noted that the generated graph may be updated as new events are received.

Figure 4:
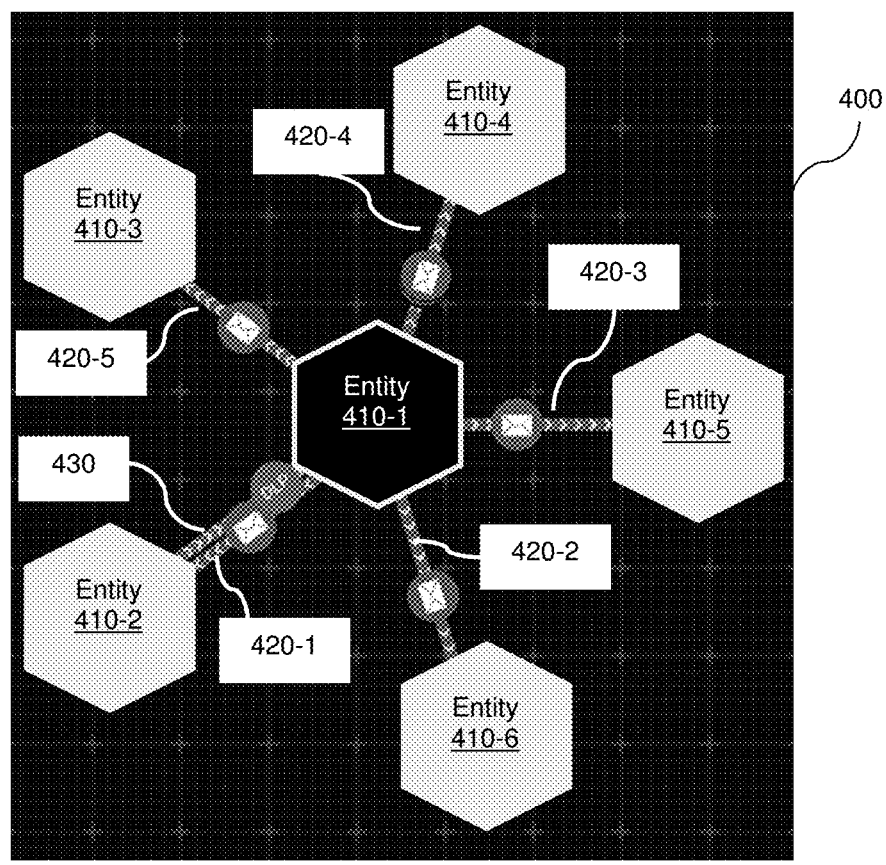
FIG. 4 is a screenshot illustrating a visual representation of a contextual event graph.

FIG. 4 is an exemplary and non-limiting screenshot 400 illustrating a visual representation of a contextual event graph. The screenshot 400 includes entities 410-1 through 410-6, email events 420-1 through 420-5 (hereinafter referred to individually as an email event 420 and collectively as email events 420, merely for simplicity purposes), and a data loss prevention event 430. The events 420 and 430 represent activities between or in the entities 410-1 through 410-6.

In the exemplary screenshot shown in FIG. 4, the entity 410-1 is an external entity, and the entities 410-2 through 410-6 are internal entities. The entities 410-1 through 410-6 include only those entities related to an organization that are relevant to this group of events, thereby reducing the amount of information presented to a cyber security analyst analyzing potential cyber security threats.

The exemplary screenshot 400 demonstrates that the entity 410-1 has sent emails to each of the entities 410-2 through 410-6 as indicated by the email events 420. Additionally, the entity 410-1 has retrieved an encrypted document from the entity 420-2 as indicated by the data loss prevention event 430. In the exemplary screenshot 400, the events 420 and 430 occurred within 30 seconds of each other, i.e., the events 420 and 430 are correlated based on time of occurrence. A user (e.g., cyber security analyst) viewing the contextual event graph may determine that the data loss prevention event 430 has a significant chance of being a cyber security threat and may, consequently, further conduct an investigation into the data loss prevention event 430 and/or the entity 410-2 by interacting with the graph. Upon detecting such interactions, the visual representation may change to show a drill-down analysis of the entity 410-2 respective of the graph.

Figure 5:
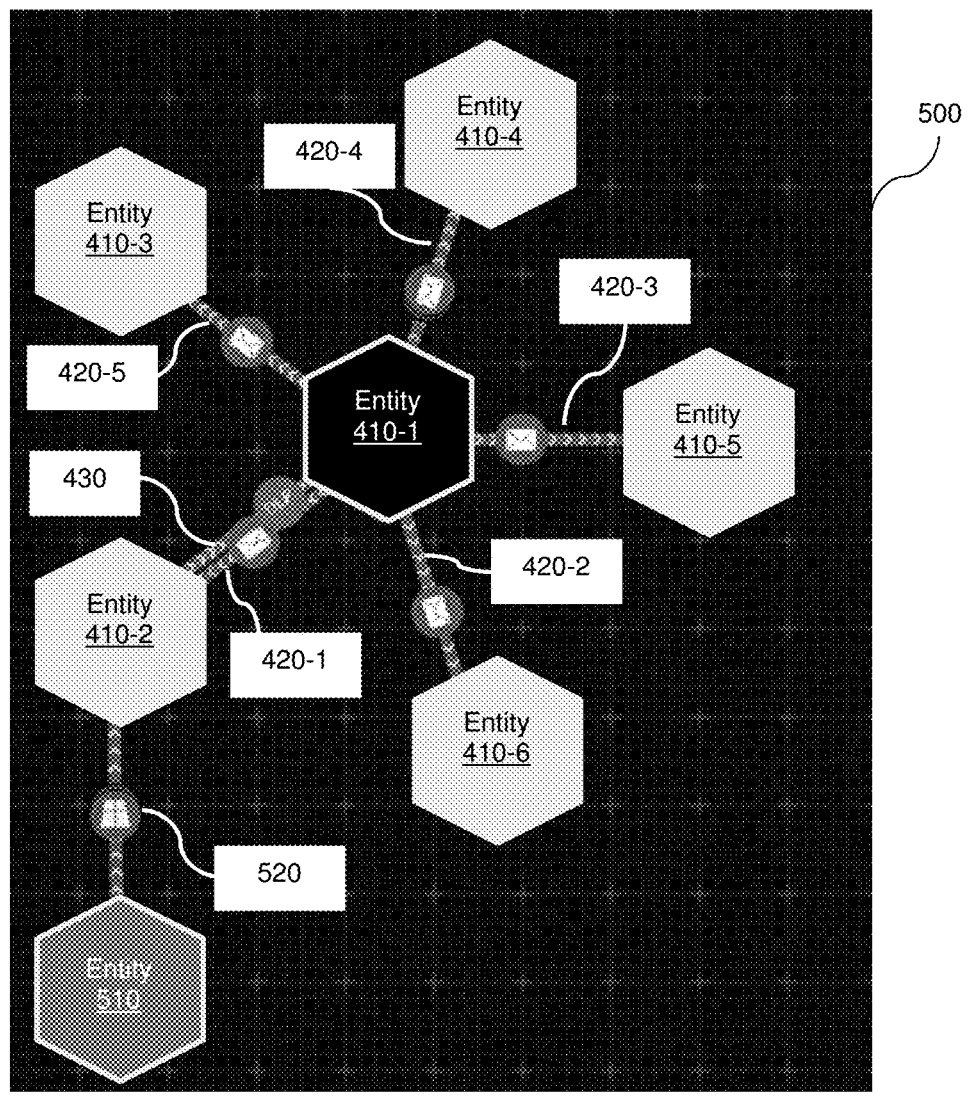
FIG. 5 is a screenshot illustrating a visual representation of a contextual event graph based on a drill-down analysis.

FIG. 5 is an exemplary and non-limiting screenshot 500 illustrating a visual representation of a contextual event graph based on a drill-down analysis of the entity 410-2. In the exemplary screenshot of FIG. 5, a user has interacted with the entity 410-2, thereby prompting display of a drill-down analysis respective of the entity 410-2. The drill-down analysis demonstrates that the entity 410-2 is also associated with a policy violation event 520 related to the internal entity 510.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method implemented by a computer for contextually analyzing potential cyber security threats in a computer network, comprising:
   receiving at least one security event for the computer network, wherein the at least one security event is associated with at least one entity, wherein an entity is a computing arrangement coupled to the network and associated with an organization;
   parsing the at least one security event;
   modeling, based on at least one modeling rule selected from a set of a plurality of modeling rules, the at least one parsed security event, the modeling being such as to identify each of the at least one entity involved in an event, and to determine at least one characteristic of the at least one security event, the at least one characteristic including at least one relationship characteristic of relationships among each of the at least one entity identified as being involved in the event;
   retrieving, based on the modeled events and by interfacing with external systems, enrichment information respective of the at least one characteristic;
   enriching the determined at least one characteristic using the enrichment information;
   unifying the at least one characteristic and the enrichment information into a data set having a single unified format; and
   generating a graph based on the unified format data set, wherein the graph represents the relationships among the at least one entity.

2. The method of claim 1, further comprising:
   upon receiving a new event, gradually updating the generated graph based on the received new security event.

3. The method of claim 1, further comprising:
   generating an analysis report based on the graph.

4. The method of claim 2, further comprising:
   causing a display of the generated graph; and
   causing a display of a drilled-down portion of the graph, wherein drilled-down portion includes at least one entity of interest.

5. The method of claim 1, further comprising:
   receiving a plurality of cases; and
   grouping the plurality of cases, the grouping being based on the generated graph.

6. The method of claim 1, wherein the at least one relationship characteristic includes at least one relationship type, wherein each relationship type is any of: user to user, user to host, host to host, and self event.

7. The method of claim 6, wherein the modeling includes determining the at least one relationship type based on a connection type between primary entities involved in each event.

8. A non-transitory computer readable medium having stored thereon instructions for causing one or more processing units to execute a process for contextually analyzing potential cyber security threats in a computer network, the process comprising:
   receiving at least one security event for the computer network, wherein the at least one security event is associated with at least one entity, wherein an entity is a computing arrangement coupled to the network and associated with an organization;
   parsing the at least one security event;
   modeling, based on at least one modeling rule selected from a set of a plurality of modeling rules, the at least one parsed security event, the modeling being such as to identify each of the at least one entity involved in an event, and to determine at least one characteristic of the at least one security event, the at least one characteristic including at least one relationship characteristic of relationships among each of the at least one entity identified as being involved in the event;
   retrieving, based on the modeled events and by interfacing with external systems, enrichment information respective of the at least one characteristic;
   enriching the determined at least one characteristic using the enrichment information;

unifying the at least one characteristic and the enrichment information into a data set having a single unified format; and generating a graph based on the unified format data set, wherein the graph represents the relationships among the at least one entity.

9. A system for contextually analyzing potential security threats in a computer network, comprising:

a hardware processing unit; and a memory, the memory containing instructions that, when executed by the processing unit, configure the system to:

receiving at least one security event for the computer network, wherein the at least one security event is associated with at least one entity, wherein an entity is a computing arrangement coupled to the network and associated with an organization;

parsing the at least one security event;

modeling, based on at least one modeling rule selected from a set of a plurality of modeling rules, the at least one parsed security event, the modeling being such as to identify each of the at least one entity involved in an event, and to determine at least one characteristic of the at least one security event, the at least one characteristic including at least one relationship characteristic of relationships among each of the at least one entity identified as being involved in the event;

retrieving, based on the modeled events and by interfacing with external systems, enrichment information respective of the at least one characteristic;

enriching the determined at least one characteristic using the enrichment information;

unifying the at least one characteristic and the enrichment information into a data set having a single unified format; and generating a graph based on the unified format data set, wherein the graph represents the relationships among the at least one entity.

10. The system of claim 9, wherein the system is further configured to:

upon receiving a new security event, gradually update the generated graph based on the received new event.

11. The system of claim 9, wherein the system is further configured to:

generate an analysis report based on the graph.

12. The system of claim 10, wherein the system is further configured to:

cause a display of the generated graph; and cause a display of a drilled-down portion of the graph, wherein drilled-down portion includes at least one entity of interest.

13. The system of claim 9, wherein the system is further configured to:

receive a plurality of cases; and group the plurality of cases using the generated graph.

* * * * *